(12) United States Patent
Lin et al.

(10) Patent No.: US 11,645,566 B2
(45) Date of Patent: May 9, 2023

(54) METHODS AND SYSTEMS FOR GRAPH COMPUTING WITH HYBRID REASONING

(71) Applicant: INTERNATIONAL BUSINESS MACHINES CORPORATION, Armonk, NY (US)

(72) Inventors: June-Ray Lin, Taipei (TW); Charlie Wu, Taipei (TW); Cheng-Ta Lee, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 415 days.

(21) Appl. No.: 16/812,743

(22) Filed: Mar. 9, 2020

(65) Prior Publication Data
US 2021/0279621 A1 Sep. 9, 2021

(51) Int. Cl.
*G06N 7/00* (2023.01)
*G06F 16/901* (2019.01)
*G06F 16/245* (2019.01)
*G06N 7/01* (2023.01)

(52) U.S. Cl.
CPC ............. *G06N 7/01* (2023.01); *G06F 16/245* (2019.01); *G06F 16/9024* (2019.01)

(58) Field of Classification Search
CPC ........ G06N 20/00; G06N 5/045; G06N 7/005; G06N 7/00; G06N 5/04; G06N 7/01; G06N 16/289; G06N 16/245; G06F 16/289; G06F 16/9024; G06F 16/245; G06F 16/901; G06F 16/28
USPC ......................................................... 706/46
See application file for complete search history.

(56) References Cited

U.S. PATENT DOCUMENTS

| | | | |
|---|---|---|---|
| 6,120,297 A | 9/2000 | Morse, III et al. | |
| 9,275,333 B2 | 3/2016 | Santos et al. | |
| 2013/0066823 A1* | 3/2013 | Sweeney | G06N 5/02 706/50 |
| 2014/0129504 A1* | 5/2014 | Soon-Shiong | G06N 5/025 706/47 |
| 2015/0106158 A1* | 4/2015 | Raman | G06F 16/337 705/7.29 |
| 2018/0011927 A1 | 1/2018 | Lee et al. | |
| 2019/0220524 A1 | 7/2019 | Costabello et al. | |
| 2019/0236215 A1* | 8/2019 | Agarwal | G06F 16/9014 |
| 2019/0244122 A1 | 8/2019 | Li et al. | |

(Continued)

FOREIGN PATENT DOCUMENTS

| | | | |
|---|---|---|---|
| DE | 112018007932 T5 * | 6/2021 | ......... G06F 16/9024 |
| WO | 2019022505 A1 | 1/2019 | |

OTHER PUBLICATIONS

"Building More Explainable Artificial Intelligence with Argumentation", Zeng et al., 2018, Association for the Advancement of Artificial Intelligence (2 Pages).

*Primary Examiner* — Tonia L Dollinger
*Assistant Examiner* — Mehulkumar J Shah
(74) *Attorney, Agent, or Firm* — Griffiths & Seaton PLLC

(57) ABSTRACT

Embodiments for graph computing are provided. A graph including a plurality explicit nodes and at least one implicit node is generated. A first of the plurality of explicit nodes and a second of the plurality of explicit nodes are traversed between utilizing deductive reasoning. A third of the plurality of explicit nodes and a fourth of the plurality of explicit nodes are traversed between through the at least one implicit node utilizing inductive reasoning.

21 Claims, 11 Drawing Sheets

(56) References Cited

U.S. PATENT DOCUMENTS

| | | | |
|---|---|---|---|
| 2020/0159753 A1* | 5/2020 | Lee | G06F 40/205 |
| 2020/0226156 A1* | 7/2020 | Borra | G06F 16/9024 |
| 2021/0173711 A1* | 6/2021 | Crabtree | G06F 16/9024 |

* cited by examiner

```
REASONING_PATH = [
    Reasoning (TI.TYPE_DOMAIN, TI.TYP_IP),
    Reasoning (TI.TYPE_DOMAIN, TI.TYP_MALWARE_FAMILY),
    Reasoning (TI.TYPE_DOMAIN, TI.TYP_THREAT_ACTOR),
    Reasoning (TI.TYPE_IP, TI.TYPE_HASH),
    Reasoning (TI.TYPE_IP, TI.TYPE _MALWARE_FAMILY),
    Reasoning (TI.TYPE_IP, TI.TYPE _ THREAT_ACTOR),
    Reasoning (TI.TYPE_HAS, TI.TYPE _MALWARE_FAMILY,
        via=TI.TYPE_DETECTION),
    Reasoning (TI.TYPE_IP, TI.TYPE _ THREAT_ACTOR,
        via=TI.TYPE_MALWARE_FAMILY),
]
```

METHODS AND SYSTEMS FOR GRAPH COMPUTING WITH HYBRID REASONING

BACKGROUND OF THE INVENTION

Field of the Invention

The present invention relates in general to computing systems, and more particularly, to various embodiments for graph computing with hybrid reasoning.

Description of the Related Art

In recent years, various forms of artificial intelligence (AI) (and/or machine learning, cognitive analysis, etc.) has been implemented in an increasing variety of applications, such as object detection, voice recognition, language processing, etc. This trend is most likely to continue, as the benefits of such systems are seemingly endless.

However, one issue with at least some AI systems is a lack of "explainability" with respect to generated output, such as a response to a query, a prediction, etc. That is, some AI systems are considered to be a "black box." More specifically, although current AI systems have proven to be very useful in some applications (e.g., high prediction accuracy), it is often difficult, if not impossible, for an individual (e.g., a software engineer) to understand exactly why the AI system generated the output it did and/or to explain the reasoning utilized by the system to another individual. At the very least, this is the case with some AI systems (e.g., deep learning or neural networks) when utilized for particular applications.

Although this may not be important when AI is utilized for relatively trivial applications (e.g., image processing, transcription, etc.), such is at least not arguably the case for important or critical applications or scenarios (e.g., security/military actions, medical decisions, investment advice, vehicle control, etc.).

SUMMARY OF THE INVENTION

Various embodiments for graph computing, by a processor, are provided. A graph including a plurality explicit nodes and at least one implicit node is generated. A first of the plurality of explicit nodes and a second of the plurality of explicit nodes are traversed between utilizing deductive reasoning. A third of the plurality of explicit nodes and a fourth of the plurality of explicit nodes are traversed between through the at least one implicit node utilizing inductive reasoning.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 11 is a plan view of a series of reasoning steps as input by a user according to an embodiment of the present invention.

DETAILED DESCRIPTION OF THE DRAWINGS

Figure 1:
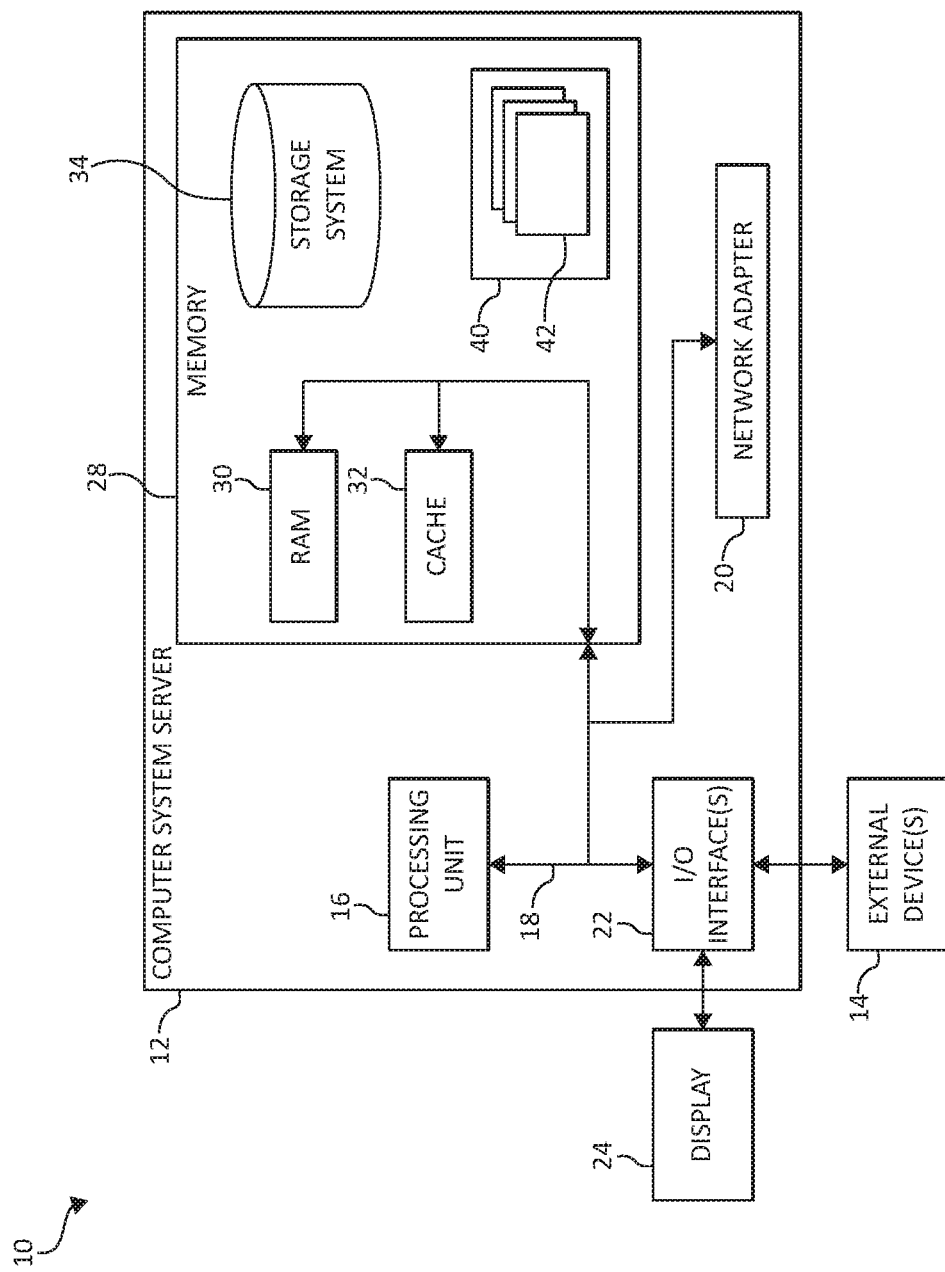
FIG. 1 is a block diagram depicting an exemplary computing node according to an embodiment of the present invention.

As discussed above, in recent years, various forms of artificial intelligence (AI) (and/or machine learning, cognitive analysis, etc.) has been implemented in an increasing variety of applications, such as object detection, voice recognition, language processing, etc. This trend is most likely to continue, as the benefits of such systems are seemingly endless.

However, one issue with at least some AI systems is a lack of "explainability" with respect to generated output, such as a response to a query, a prediction, etc. That is, some AI systems are considered to be a "black box." More specifically, although current AI systems have proven to be very useful in some applications (e.g., high prediction accuracy), it is often difficult, if not impossible, for an individual (e.g., a software engineer) to understand exactly why the AI system generated the output it did and/or to explain the reasoning utilized by the system to another individual.

At the very least, this is the case with some AI systems when utilized for particular applications. More specifically, as a few examples, deep learning and neural networks are generally considered to offer relatively high prediction accuracy but are also considered to provide the least amount of explainability with respect to generated output. Ensemble methods, such as random forests, and support vector machines (SVMs) are usually thought to provide slightly improved explainability but reduced accuracy. Explainability is further improved to some degree with graphical models (e.g., Bayesian networks), decision trees, and classification rules but with even lower accuracy.

As a specific example, consider the use of a decision tree to predict whether or not a particular webpage related to a published article is a "normal" webpage (i.e., includes the entire article) or an "excerpt" page (i.e., only includes excerpts, abstracts, summaries, etc. of articles). An AI system utilizing a decision tree in such a scenario may utilize the length (or character count) of the URL of the webpage in making this prediction (e.g., the longer the URL, the more likely it is that the webpage includes the whole article). Although utilizing such a metric may provide some improvement in explainability compared to a similar output generated by a neural network, the use of such a metric itself may not be readily understood by users (e.g., individuals, humans, etc.). That is, users may not understand how and/or why URL length is related to the content on the webpage.

Although this issue regarding explainability may not be important when AI is utilized for relatively trivial applications (e.g., image processing, transcription, etc.), such is at least not arguably the case for important or critical applications or scenarios (e.g., security/military actions, medical decisions, investment advice, vehicle control, etc.).

In contrast to AI systems, reasoning engines (or semantic reasoners, rules engines, etc.) may be utilized in such a way to offer relatively explicit or clear explainability. However, generally, reasoning engines do have not the same capabilities of modern AI systems, particularly with respect to learning and/or training based on provided examples.

As one example of an application of reasoning, consider a scenario in which reasoning (or a reasoning engine) is utilized to determine if a particular web domain is "malicious" (i.e., includes any sort of malicious software or "malware") and/or identify the actor behind the domain. As an initial step, any internet protocol (IP) addresses associated with the domain may be identified. Any software hashes (or software components) that communicate with any of those IP address may then be identified. Various data sources, such an anti-virus engine detections, stores, databases, etc., may then be searched in order to determine whether or not any of the hashes (and/or associated software components) have been listed and/or categorized as malware (and/or whether or not the actor behind such has been listed). However, conventional reasoning (or a conventional reasoning engine) is generally only able to employ reasoning from "known" facts (or deductive reasoning). As will be appreciated by one skilled in the art, deductive arguments (or reasoning) are those for which the conclusions follow, or appear to follow, necessarily and/or include beginning with a general principle and applying the general principle to a specific case. For example, given the evidence "All teachers are funny" and "Karen is a teacher," it necessarily follows that Karen is funny.

As such, when utilized in such a scenario, conventional reasoning engines can only identify a domain as being associated with malware and/or a particular actor when such a determination has been previously made by another entity (e.g., a government agency, an anti-virus engine, etc.) and, as stated above, reasoning engines do not have the learning and/or training capabilities of many AI systems.

To address these needs and/or the shortcomings in the prior art, in some embodiments described herein, methods and/or systems are disclosed that provide (and/or utilize) a reasoning engine that incorporates at least some of the benefits of modern AI (or machine learning (ML), cognitive analysis, etc.) systems, such as learning and/or training based on provides examples (e.g., training data) in order to generate predictions, etc., while also providing improved explainability. In particular, in some embodiments, methods and/or systems for graph computing, which utilize inductive reasoning (or probabilistic reasoning, or probabilistic inductive reason), perhaps combined with deductive reasoning, are provided. In particular, in some embodiments, methods and systems described herein may be considered to provide inductive reasoning utilizing graphical knowledge (or graph computing) that is guarded or enhanced by the math function of discriminant power.

For example, with respect to the cyber security scenario described above, the methods and systems described herein may utilize reasoning engines similar to that described above. However, in at least some embodiments, the reasoning is augmented such that the engine is capable of generating predictions and/or performing inductive reasoning. As such, as one example, whether or not a particular piece of software (or hash) has been labeled or marked as suspicious or questionable by one or more anti-virus engine (as opposed to being definitively listed as malware by an organization) may be utilized by the system to generate a prediction as to whether or not the software is malware (and/or predict the actor controlling the domain, etc.). More specifically, in some embodiments, a particular conclusion (or prediction, determination, etc.) may be reached even without known facts, utilizing inductive (or non-deductive) reasoning. As will be appreciated by one skilled in the art, inductive arguments (or reasoning) are those for which the conclusions "probably" follow or appear to follow and/or include beginning with one or more specific (or special) case and attempting to generate general principle based on the specific case(s). For example, given the evidence "90% of teachers are funny" and "Karen is a teacher," it (probably) follows that Karen is funny (or more specifically, there is a 90% chance that Karen is funny).

Continuing with the cyber security scenario more specifically, if a particular hash is identified but has not be officially documented as being associated with a malware family, the system may search through multiple anti-virus engine databases to identify any information or detections related to the hash. Depending on information that is identified (e.g., multiple anti-virus engines labeling the hash/software as suspicious), the system may be able to generate a prediction of whether or not the software is malware. In some embodiments, the inductive reasoning may be "stacked" such that multiple inductions may be made, as discussed in greater detail below.

It should be understood that although some embodiments provided herein are described with respect to cyber security scenarios, the methods and/or systems described herein may be applied to any scenario in which a reasoning engine and/or machine learning technique (or AI, cognitive analysis, etc.) may be utilized.

In some embodiments, the reasoning described herein is performed utilizing graph computing (or traversing graph databases), as is commonly understood in the art. According to at least some aspects of functionality described herein, traversals between nodes (of the graphs) is performed utilizing hybrid reasoning, which includes inductive reasoning combined, in some embodiments, with deductive reasoning. In some embodiments, the graphs may be understood to include two types of nodes: explicit (or a first type of) nodes and implicit or "via" (or a second type of) nodes. Traversals between explicit nodes may be performed utilizing deductive reasoning. However, when deductive reasoning is not able to allow for a traversal between two explicit nodes, inductive reasoning may be utilized, which may be considered to include traversing between two of the explicit nodes in an "indirect" manner, through one or more of the implicit nodes. In some embodiments, the inductive reasoning includes and/or utilizes probabilistic inductive reasoning.

It should be understood that at least some of the aspects of functionality described herein may be performed utilizing a cognitive analysis. The cognitive analysis may include natural language processing (NLP) or a NLP technique, such classifying natural language, analyzing tone, and analyzing sentiment (e.g., scanning for keywords, key phrases, etc.) with respect to, for example, content and communications sent to and/or received by users or entities and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for object detection/classification in images/videos), as are commonly understood, are used.

The processes described herein may utilize various information or data sources associated with users and/or entities (e.g., subjects of queries, data sources, etc.) and/or the content of communications. The data sources may include any available information (or data) sources associated with the user and/or entities. For example, in some embodiments, a profile (e.g., a cognitive profile) for the user(s) (and/or entities) may be generated. Data sources that may be use used to generate cognitive profiles may include any appropriate data sources associated with the user/entity that are accessible by the system (perhaps with the permission or authorization of the user/entity). Examples of such data sources include, but are not limited to, communication sessions and/or the content (or communications) thereof (e.g., phone calls, video calls, text messaging, emails, in person/face-to-face conversations, etc.), a profile of (or basic information about) the user/entity (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, graph computing as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for graph computing, by a processor, is provided. A graph including a plurality explicit nodes and at least one implicit node is generated. A first of the plurality of explicit nodes and a second of the plurality of explicit nodes are traversed between utilizing deductive reasoning. A third of the plurality of explicit nodes and a fourth of the plurality of explicit nodes are traversed between through the at least one implicit node utilizing inductive reasoning.

A query associated with the graph may be received. A response to the query may be generated based on the traversing between the first of the plurality of explicit nodes and the second of the plurality of explicit nodes and the traversing between the third of the plurality of explicit nodes and the fourth of the plurality of explicit nodes. The at least one implicit node may include a plurality of implicit nodes.

The traversing between the third of the plurality of explicit nodes and the fourth of the plurality of explicit nodes may include a first traversal from the third of the plurality of explicit nodes to the fourth of the plurality of explicit nodes through a first of the plurality of implicit nodes utilizing inductive reasoning and a second traversal from the third of the plurality of explicit nodes to the fourth of the plurality of explicit nodes through a second of the plurality of implicit nodes utilizing inductive reasoning. The first traversal may be external to the second of the plurality of implicit nodes, and the second traversal may be external to the first of the plurality of implicit nodes.

The traversing between the third of the plurality of explicit nodes and the fourth of the plurality of explicit nodes may include traversing from the third of the plurality of explicit nodes through a first of the plurality of implicit nodes to a second of the plurality of implicit nodes utilizing inductive reasoning and traversing from the second of the plurality of implicit nodes to the fourth of the plurality of explicit nodes utilizing inductive reasoning.

The generating of the graph may include receiving user input associated with the at least one implicit node and generating the at least one implicit node based on the user input. The traversing between the third of the plurality of explicit nodes and the fourth of the plurality of explicit nodes through the at least one implicit node may be performed utilizing probabilistic inductive reasoning.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
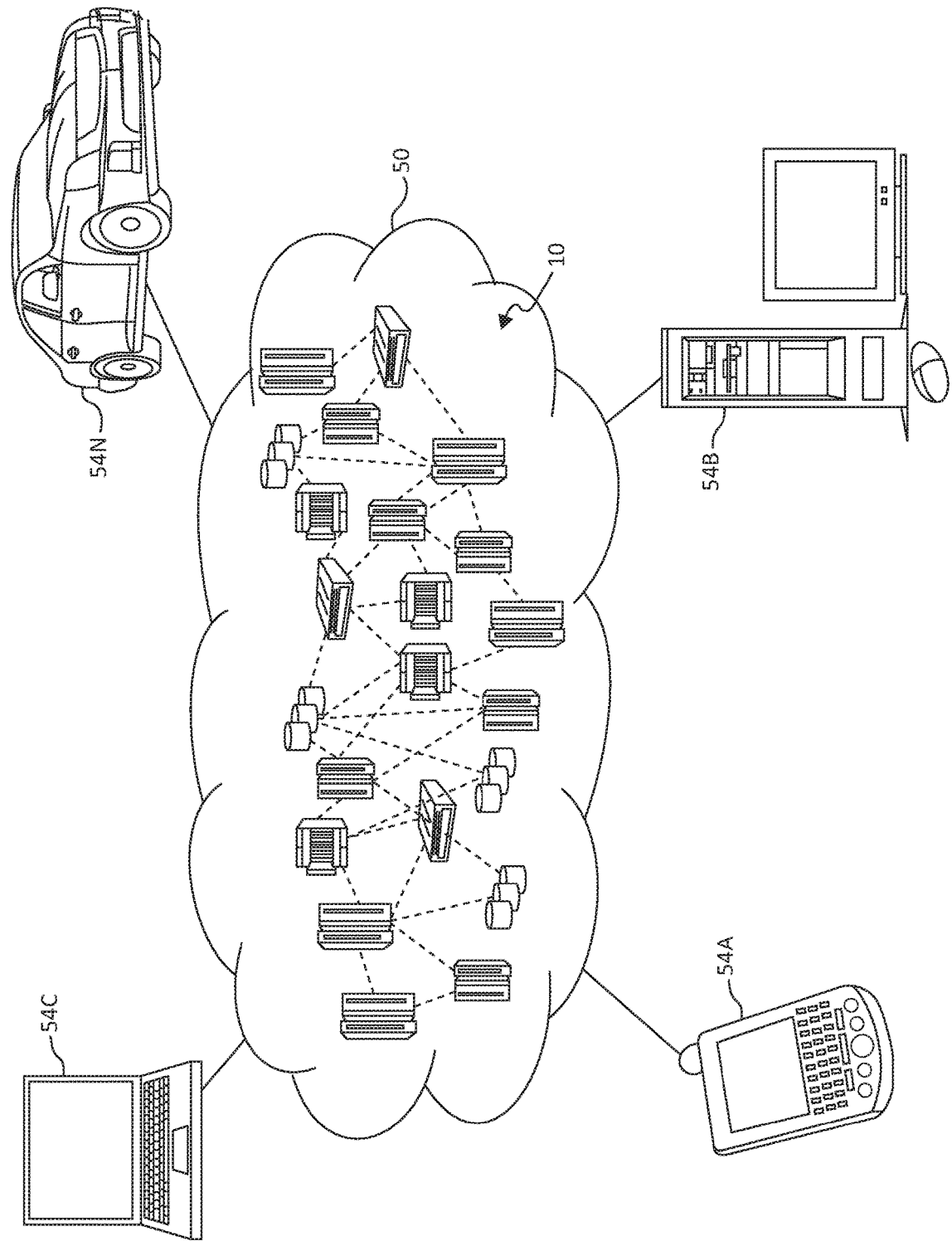
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
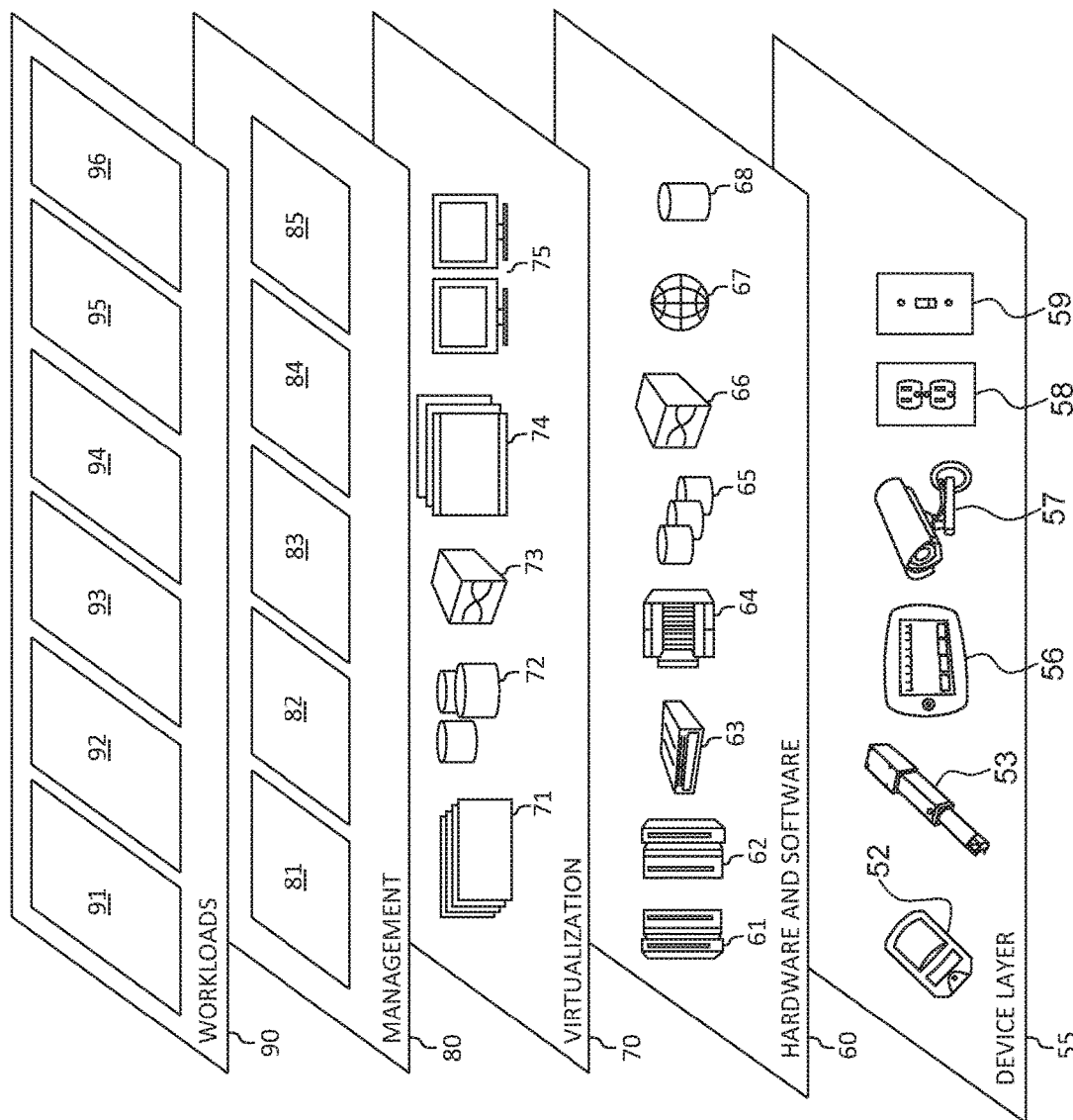
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for graph computing, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are described that provide (and/or utilize) a reasoning engine that incorporates at least some of the benefits of modern AI (or machine learning (ML), cognitive analysis, etc.) systems, such as learning and/or training based on provides examples (e.g., training data) in order to generate predictions, etc., while also providing improved explainability.

In some embodiments, the reasoning described herein is performed utilizing graph computing, as is commonly understood in the art. According to at least some aspects of functionality described herein, traversals between nodes (of the graphs) is performed utilizing hybrid reasoning, which includes inductive reasoning combined, in some embodiments, with deductive reasoning. In some embodiments, the graphs may be understood to include two types of nodes: explicit (or a first type of) nodes and implicit or "via" (or a second type of) nodes. Traversals between explicit nodes may be performed utilizing deductive reasoning. However, when deductive reasoning is not able to allow for a traversal between two explicit nodes, inductive reasoning may be utilized, which may be considered to include traversing between two of the explicit nodes in an "indirect" manner, through one or more of the implicit nodes. In some embodiments, the inductive reasoning includes and/or utilizes probabilistic inductive reasoning.

Figure 4:
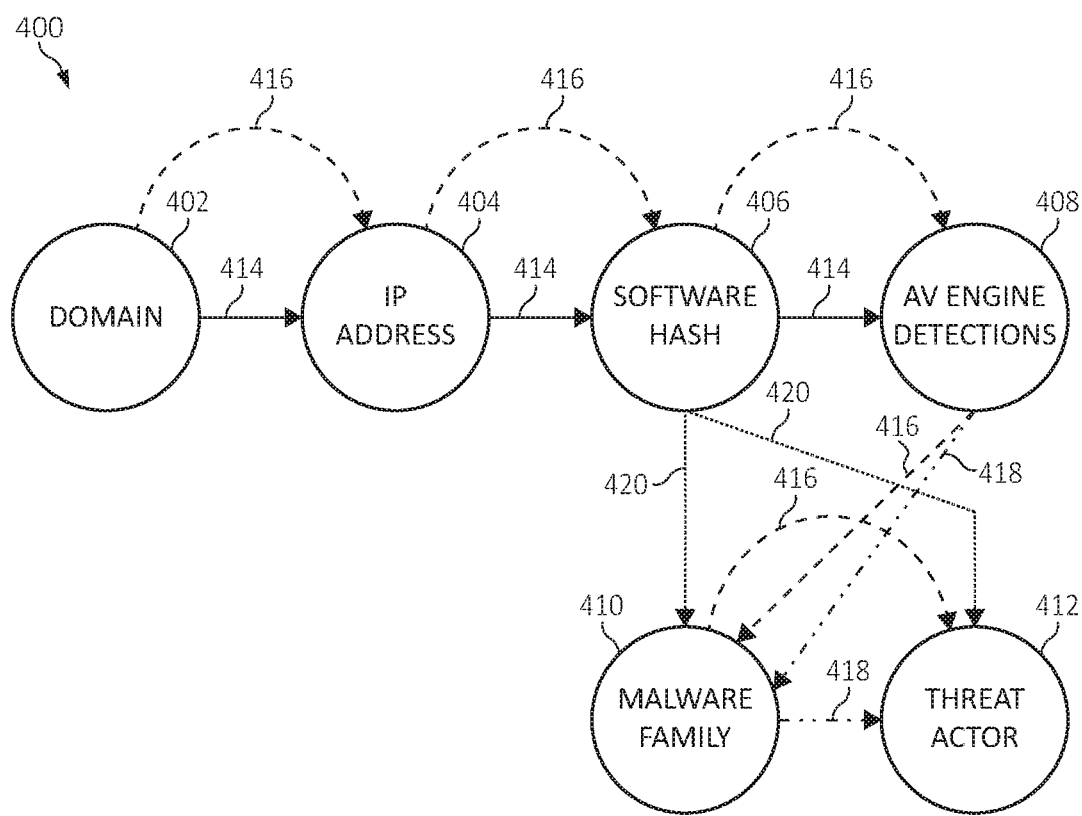
FIGS. 4-8 are schematic views of a graph database according to an embodiment of the present invention.

FIG. 4 illustrates a graph (or graph database or reasoning engine or method) 400 according to an embodiment of the present invention. However, it should be understood that FIG. 4 may be understood to simply illustrate a reasoning process which may performed by the methods and systems described herein. In the example shown, the graph 400 is related to a cyber security query (e.g., as received from a user), such as the one described above (i.e., whether or not a domain is malicious and/or who the actor is behind the domain). The graph includes (explicit) nodes 402-412, and although not shown, traversing the graph 400 may be performed utilizing implicit (or via) nodes, as explained below. Node 402 represents a particular web domain, node 404 represents an IP address, node 406 represents a software hash, node 408 represents one or more anti-virus (AV) engines (or engine detections), node 410 represents a malware family, and node 412 represents a threat actor, as will be appreciated by ones skilled in the art.

Multiple edges (or connections or links) 414-418 are shown interconnecting the nodes, each of which may be considered to represent at least a potential traversal between the associated explicit nodes 402-412, perhaps utilizing an implicit node (not shown). In particular, edges 414 represent reasoning steps that may be performed based on known information and/or deductive reasoning. More specifically, in the particular example shown, deductive reasoning may be utilized to determine that a particular IP address is associated with the web domain (i.e., a traversal from node 402 to node 404), a particular software hash is associated with the IP address (i.e., a traversal from node 404 to node 406), and one or more AV engines have labeled or marked the hash in some way, such as by marking the hash as "suspicious" (i.e., a traversal from node 406 to node 408).

However, in this example shown, no additional traversals may be performed utilizing deductive reasoning. For example, although the software hash has been labeled/marked/detected by one or more AV engine, it has not be classified as being associated with a malware family nor has any threat actor associated with the software hash been identified (e.g., by an appropriate cyber threat organization, authority, etc.).

Still referring to FIG. 4, edges 416 may represent information related to examples which may indicate a traversal between the two associated nodes may be possible, but it is not certain (e.g., real-world information that suggests inductive reasoning may allow for the traversal to take place). For example, edge 416 between node 408 and 410 may represent that one or more AV engines has labeled the software hash as potentially being associated with the malware family represented by node 410. In some embodiments, such information may be utilized to predict (or estimate, etc.) whether or not the software hash is associated with the malware family based on inductive reasoning (e.g., probabilistic inductive reasoning), as represented by edge 418 between node 408 and 410. Additionally, edge 416 between node 410 and node 412 may represent information that indicates that the particular malware family is used by particular threat actors but such is not certain. Again, inductive reasoning may be utilized to predict that the malware family is associated with or used by a particular threat actor (if the available information is sufficient to allow such an inference), as represented by edge 418 between node 410 and 412. In some embodiments, a threshold with respect to probabilistic induction is utilized (e.g., the inference is allowed/performed in the probability is determined to be at least 80% or some other percentage). In this manner, traversing the graph 400 may be performed utilizing both deductive and inductive reasoning (or "hybrid reasoning").

If such conclusions are reached via inductive reasoning, such may be utilized as training data for the reasoning engine, as represented by edges 420 between node 406 and nodes 410 and 412, and/or any appropriate conclusions, predictions, etc. may be provided to the user (e.g., as a response to a query). Additionally, the reasoning steps (including any inductive reasoning) utilized may be provided to the user to provide improved explainability, at least when compared to most AI systems.

Still referring to FIG. 4, it should be noted that nodes 402-408 are also interconnected by three of the edges 416 (i.e., representing information/evidence of a possible inference). For example, edge 416 between node 402 and node 404 may represent information that indicates that many IP address are resolved from the domain of interest, and edge 416 between node 404 and 406 may represent information that indicates that many software hashes communicate with the IP address of interest. However, as an example, it may be assumed that such information is not sufficient to allow an inference (although in these instances such may not be relevant as deductive reasoning was possible for traversal between the nodes in question).

Figure 5:
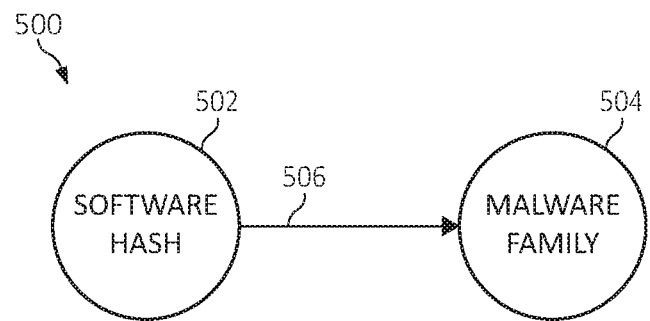

FIG. 5 illustrates a graph (or a portion thereof) 500 according to an embodiment of the present invention. The graph 500 includes a software hash node 502 (i.e., a node that represents the concept of a particular software hash) (or source node) and a malware family node 504 (i.e., a node that represents the concept of a particular malware family) (or target node). In the example shown, an edge 506 is shown interconnecting (or linking) the nodes 502 and 504. As an example, it may be assumed that the traversal performed utilizing the edge 506 is performed utilizing deductive reasoning. That is, the particular software hash represented by node 502 (or more particularly, the associated software component) may be "known" to be a member of the particular malware family represented by node 504 (e.g., as indicated in a database administrated by an appropriate organization) and/or malware in general. As such, the traversal may be made from node 502 directly to node 504 utilizing deductive reasoning.

Figure 6:
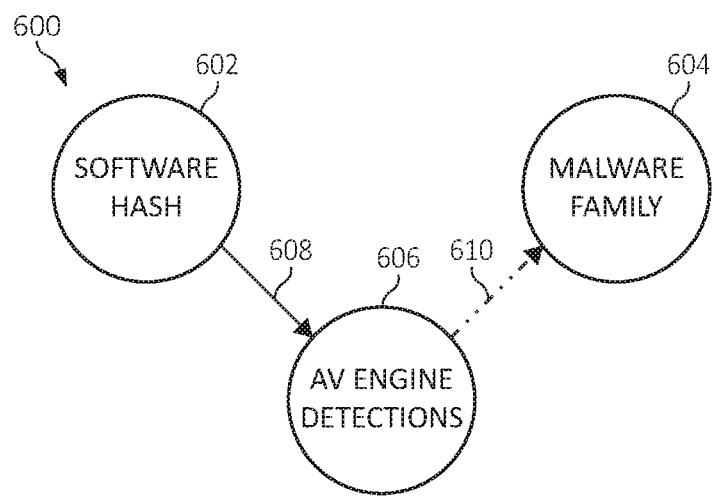

In contrast, deductive reasoning may not be utilized in the example shown in FIG. 6, which includes a similar software hash node 602 and a malware family node 604. More particularly, in this example, the particular software hash represented by node 502 may not be "known" to be a member of the particular malware family represented by node 504, such that deductive reasoning may not be utilized to traverse from (source) node 602 directly to (target) node 604. As such, in some embodiments, the methods and systems described herein essentially search for other information (or information/data sources) that may (or may not) allow an inference to be made utilizing inductive reasoning (e.g., an "indirect" path/traversal from node 602 to node 604). In some embodiments, this processed is performed utilizing one or more implicit (or "via") nodes, such as AV engine detection node 606. The utilization (and/or generation) of implicit (or via) nodes may be performed in response to user input. That is, the user may provide an indication to the system to look for alternative ways to traverse between nodes if deductive reasoning may not be utilized. In the example shown, the implicit node is associated with AV engine detections (and/or AV engine databases on which various information related to hashes is stored). Although only implicit node is shown in FIG. 6, it should be understood that multiple implicit nodes may be utilized (and/or generated within the graph).

Still referring to FIG. 6, in the example shown, an edge 608 is formed between node 602 and the implicit node 606, which is representative of deductive reasoning being utilized to traverse between node 602 and implicit node 606. More specifically, the AV engine detection(s) represented by node 606 has been found to include information related to the software hash of node 602. As such, deductive reasoning may be utilized to traverse to implicit node 606. However, although the AV engine detection(s) includes information related to the hash (e.g., the AV engine has marked/labeled the hash as suspicious, etc.), the associated software component has not be determined to be "known" to be malware and/or from a particular malware family (i.e., such is not definitively known). As such, deductive reasoning may not be utilized to traverse from implicit node 606 to node 604.

In some embodiments, the system utilizes the information available through the implicit node(s) to determine if such a traversal may be made utilizing inductive reasoning (e.g., probabilistic inductive reasoning) or an inference. This process may include calculating a probability (and/or a score) utilizing the available information (e.g., the system calculates the probability that the software hash is associated with a software component that is malware). If the calculated probability (or score) exceeds a predetermined threshold (e.g., 80%), the system may allow the traversal to take place (and/or perform the traversal) and generate a signal thereof to notify the user, utilize the inference for training, etc. It should be understood that the system may not allow for such traversals to take place utilizing inductive reasoning until multiple independent sources of information indicate the relevant inference (e.g., dozens of AV engines list a hash as suspicious). The generated inference may then be utilized as training for future use of the graph (or graph database).

Figure 7:
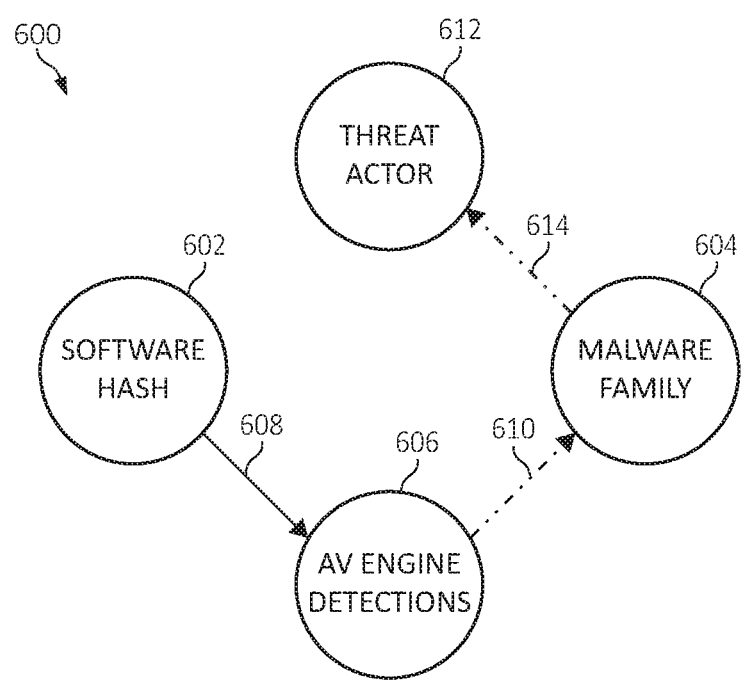

Referring now to FIG. 7, the graph 600 of FIG. 6 is again shown, but with an additional (explicit) node 612 that represents a particular threat actor. In some embodiments, the use of the implicit nodes and/or inductive reasoning may be "stacked." For example, if inductive reasoning allows the inference to be made (through via node 606) that the software hash is associated with a particular malware family, the system may be able to make a similar inference as to whether or not a particular threat actor (e.g., a country, a "hacker" group, etc.) is behind the malware (e.g., via edge 614). For example, various types of information may be located through one or more via nodes (e.g., AV engine detections) that a particular malware family is "usually" associated with the actions of a particular threat actor. Thus, in FIG. 7, node 604 may be considered to be (or to act as) an implicit node. A probabilistic inductive reasoning process similar to that described above may be utilized. Any such inferences made may then be utilized in any suitable manner (e.g., to notify the user, for system training, etc.).

Figure 8:
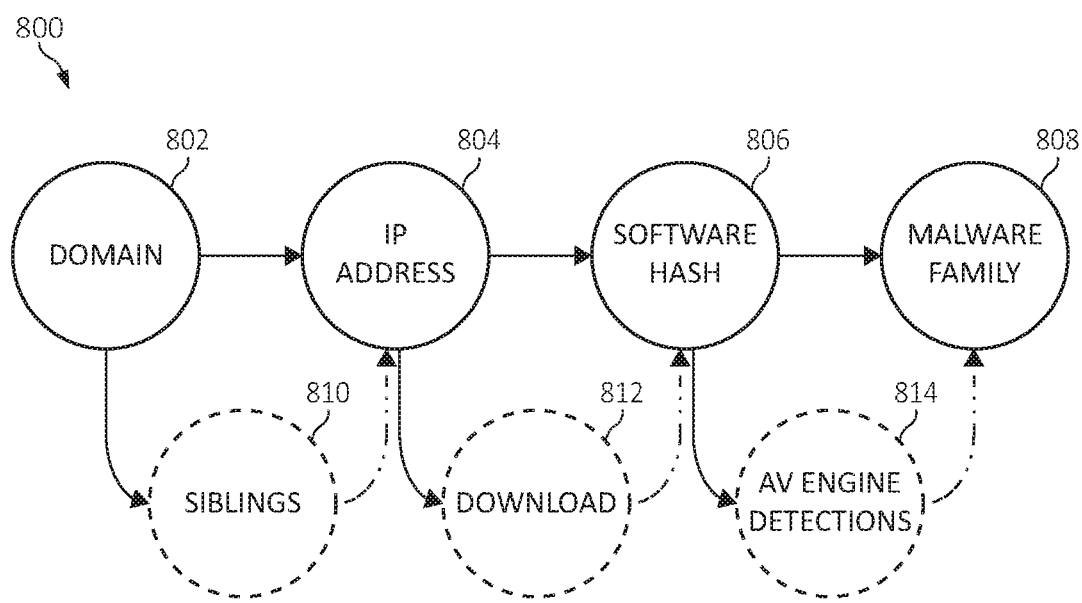

Referring now to FIG. 8, a graph 800 (similar to those described above) is shown. The graph includes four explicit nodes 802-808 (and/or an explicit portion or explicit graph that includes nodes 802-808) and three implicit (or via) nodes 810-814 (and/or an implicit portion or implicit graph that includes nodes 810-814). The graph 800 and/or nodes 802-814 may be generated in response to user input. As shown, the explicit nodes 802-808 represent a domain, an IP address, a software hash, and a malware family, respectively. Implicit nodes 810-814 represent "siblings" 810, download(s) 812, and AV engine detections 814.

That is, when utilizing the graph 800 shown in FIG. 8, the system may first attempt to resolve a particular IP address from the domain in question using deductive reasoning. If such is not possible, the system may attempt to make an inference (or use deductive reasoning) through sibling node 810 (i.e., attempting to infer whether or not the IP address may be resolved to the domain because it is related to "sibling" domains, such as those administered in another country). Similarly, if the system is not able to deduce that the software associated with the software hash communicates with the IP address, the system may look for a way to make an inference that the software hash is related to the IP address because the related software has been downloaded from the IP address through download node 812. The AV engine detection implicit node 814 may be utilized as described above. It should be noted that in the graph 800 shown in FIG. 8, the user has defined a via node between each of the pairs of successive explicit nodes. As such, it should be understood that implicit (or via) nodes may be utilized (or defined), along with inductive reasoning, in multiple places on a graph (or graph database) (i.e., if the available information allows for such inferences).

Figure 9:
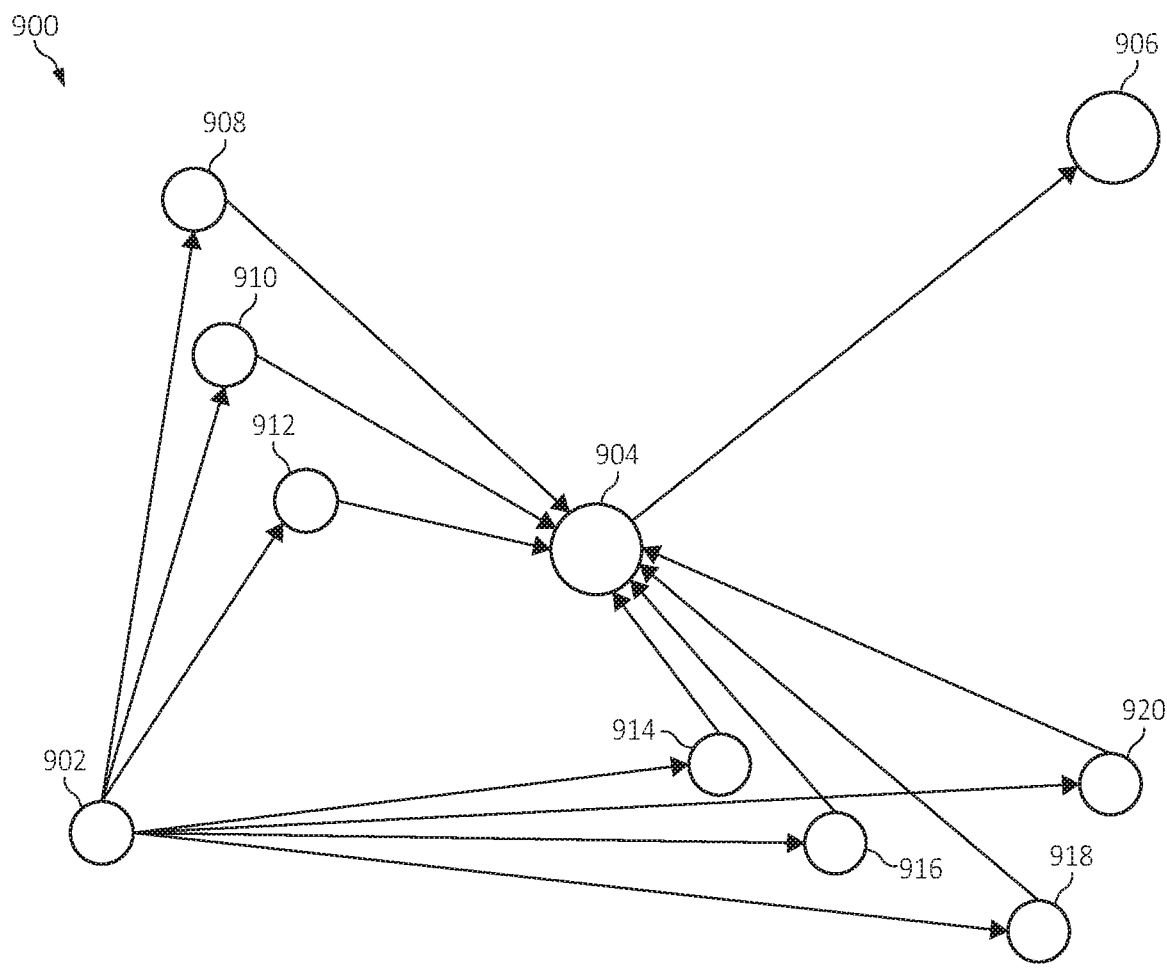
FIG. 9 is a schematic view of a graph database with multiple implicit nodes according to an embodiment of the present invention.

FIG. 9 illustrates a graph 900 (or at least a portion thereof) according to an embodiment of the present invention. The graph includes explicit nodes 902-906 and implicit (or via) nodes 908-920. Explicit nodes 902, 904, and 906 may represent a particular software hash, a particular malware family, and a particular threat actor, respectively, and each of the implicit nodes 908-920 may represent a particular AV engine. If the system is not able to traverse from node 902 to node 904 utilizing deductive reasoning, the system may then query the implicit nodes. As examples, node 908 may have the hash labeled as "Trojan.generic," and node 910 may have it labeled as "unsafe." Node 912 may have the label "malware (AI score=100)," and so on. It should be noted that some of the AV engines label the hash as more suspicious, malicious, etc. and/or more specifically and/or with greater confidence than others. Such may be the same in other embodiments (i.e., when the methods/systems described herein are applied to other scenarios/fields). This may be utilized to apply a weighting scheme to the utilized via nodes (e.g., higher confidence and/or specific information and/or information sources may be given a higher weighting). However, even if the hash is not "known" to be associated with malware, the various labels, etc. for the hash discovered by querying the implicit nodes may allow the system to infer that the software is malware and/or related to the particular malware family, as described above.

Still referring to FIG. 9, it should be noted that multiple different, independent paths may be utilized to traverse between node 902 and node 904 utilizing inductive reasoning. For example, a first traversal (path) may pass through node 908, while a second traversal that external to, outside of, etc. the first traversal (and node 908) may pass through node 918.

With respect to the calculating of probabilities and/or scores, when traversing from a first node (A) to a second node (B) utilizing deductive reasoning, the probability may be generally expressed as P(A and B)=P(A)*P(B given). Because of P(B given A) is from a database lookup (i.e., a known fact, 100% certain, etc.), the probability is always 1. In a mathematical form, the probability may be expressed as $$P(A \cap B) = P(A) \times P(B|A) = P(A) \quad (1)$$

However, when traversing between a first node (A) to a second node (B) through a implicit (or via) node (V) utilizing inductive reasoning, the probably may generally be expressed as P(A and B)=P(A and V)*P(B|(A and V)), which may be written as P(A)*P(V|A)*P(B|(A and V)). Because P(V|A) is from a database lookup, it is always 1. Thus, P(A and V)=P(A) and P(A and B)=P(A)*P(B|V). It should be noted that V is a set and may have more than one elements (e.g., $\{v_1, v_2, \ldots, v_n\}$). P(B|V) may be determined by number of nodes #($v_{dp}$) with discriminant power and may be expressed as $$P(B|V) = 1 - \frac{1}{\#(v_{dp}) + 1} \quad (2)$$

For each via (or implicit) node, its discriminant power may be expressed as $$NDP(p, q) = \frac{\sqrt{3}}{\pi} \left( \log \frac{\frac{1}{p}}{1 - \frac{1}{p}} + \log \frac{\frac{q - 2p - 1}{q - p - 2}}{1 - \frac{q - 2p - 1}{q - p - 2}} \right) \quad (3)$$

Simply put, it is desirable that the node reach fewer classes than its number of edges. In some embodiments, if a node is "pointing to" three classes through three edges, the node is not discriminant enough to point to a specific class. In Equation 3, p represents the number of outgoing edges from the particular node, and q is the number node classes reachable by the current class. Generally, discriminant power may be expressed as $$DP = \frac{\sqrt{3}}{\pi} (\log X + \log Y). \quad (4)$$

In Equation 4, X=sensitivity/(1−sensitivity), and Y=specificity(1−specificity). Sensitivity may be defined as tp/(tp+fn), and specificity may be defined as tp/(fp+tn). In some embodiments, node discriminant power may be scaled between 0 and 3 (or 4), with a value of approximately 2.5 or greater (or 3.0) being considered sufficient to be utilized to generate a prediction. In some embodiments, probability is based on previous nodes. For example, when utilizing inductive reasoning, a probability associated with traversing from node B to node C may be affected by the probability associated with traversing from node A to node B.

Figure 10:
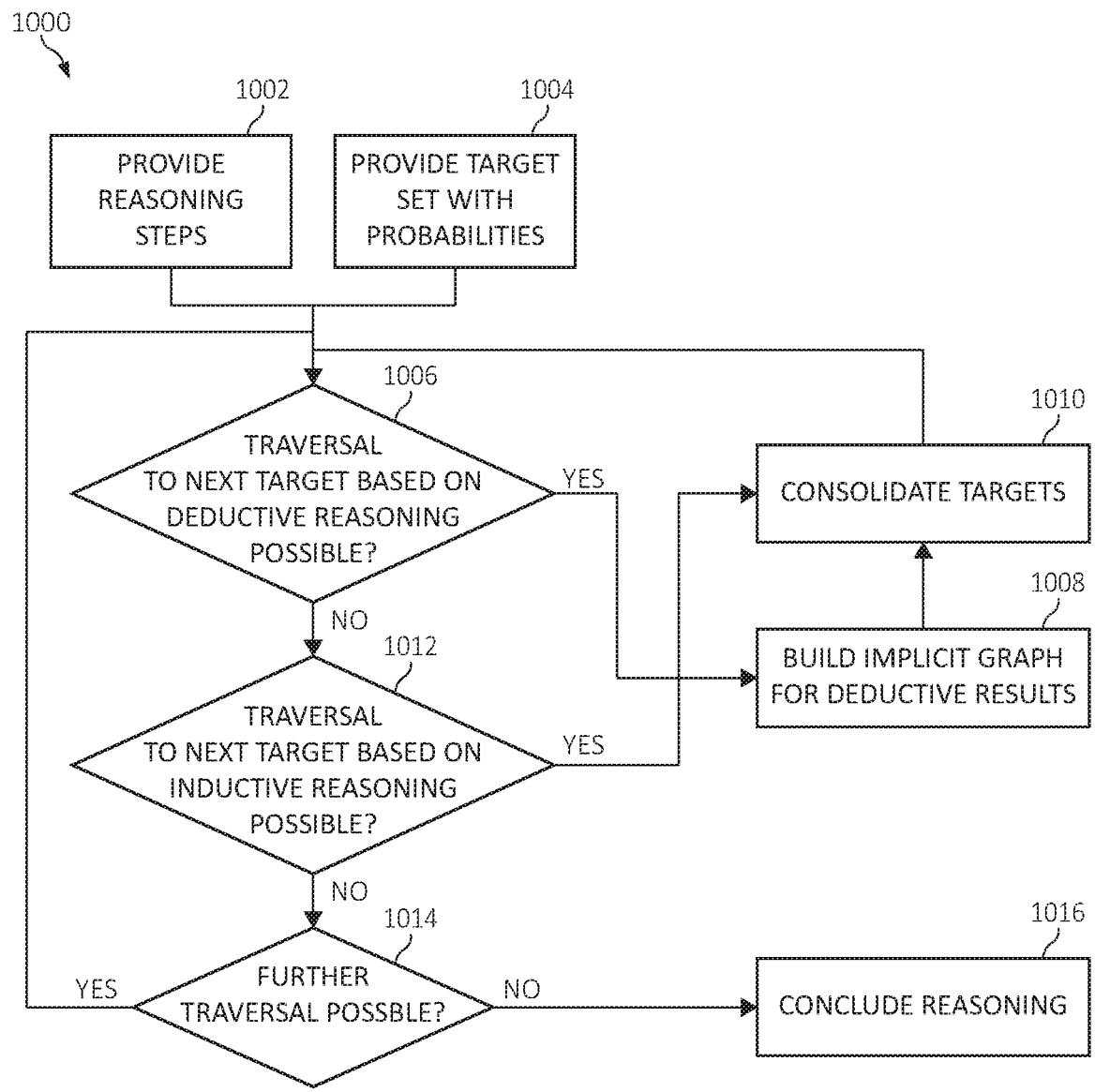
FIG. 10 is a block diagram of a method for graph computing according to an embodiment of the present invention.

Referring now to FIG. 10, a method (and/or system) 1000 for reasoning (or graph computing) is shown. At block 1002, a user provides one or more reasoning steps, which in some embodiments, includes both explicit nodes and implicit (or via) nodes. In other words, in some embodiments, the implicit nodes (and perhaps explicit nodes) are generated in response to user input. In some embodiments, the user may also provide a set of targets (or target nodes) with probabilities, such as at block 1004.

At block 1006, the system attempts to traverse to a next target based on (or utilizing) deductive reasoning, as described above. If such traversal is possible, at block 1008, any implicit nodes that are associated with already traversed explicit nodes are generated (and may be utilized in the future). Then, at block 1010, at least some of the targets may be consolidated (e.g., based on high probabilities, similarity, etc.), if appropriate, and the method 1000 returns to block 1006.

However, if no (further) traversal is possible utilizing deductive reasoning, at block 1012, the system attempts to traverse to a next target utilizing inductive reasoning, as described above. If such is possible, the method proceeds to block 1010, and then returns to block 1006. If it is not possible, at block 1014, the system determines whether or not any additional traversal is possible. If so, the system may return to block 1006, and if not, at block 1016, the reasoning process is concluded. The system may then generated any appropriate prediction, notification, etc. based on the traversal(s) that were made during the reasoning process, perhaps including information provided improved explainability.

FIG. 11 illustrates a reasoning path 1100 as input or defined by a user (and as shown on graphical user interface or computing device). As shown, the reasoning path includes a series of reasoning steps, each of which is associated with at least a pair of nodes. In particular, the first (or top) six reasoning steps 1102 are associated with the system attempting to traverse from a first explicit node directly to a second explicit node (e.g., a domain node to an IP address node, a domain node to a malware family, etc.) utilizing deductive reasoning. The last (or bottom) two reasoning steps 1104 are associated with the system attempting to traverse from a first explicit node to a second explicit node through a via node (e.g., a hash node to a malware family node through a AV detection node, etc.) utilizing inductive reasoning. In some embodiments, the system may receive such input from the user and use it to generate the graphs and perform the traversals, as described above. In some embodiments, the system only utilizes the reasoning steps that include the use of implicit nodes (and/or the use of inductive reasoning) if the associated explicit nodes are unable to be traversed utilizing deductive reasoning.

As such, in some embodiments, the methods and systems described herein allow for "extra" (or implicit or via) nodes to be defined (e.g., for each pair of explicit nodes) in graphs (or graph databases). An implicit graph (or a portion of the graph that includes the implicit nodes) may be automatically generated for inductive reasoning. In some embodiments, the implicit nodes (and/or the associated inductive reasoning) may be "stacked" for complicated reasoning scenarios. Additionally, the methods and systems described herein may allow for traversing the explicit nodes (or explicit portion of the graph) and the implicit nodes (or implicit portions of the graph) utilizing both deductive and inductive reasoning (or "hybrid" reasoning).

The methods and systems described herein may provide "white box" reasoning, which may be verified and/or easily understood by humans (at least on a relative basis when compared to most AI systems), as, for example, the reasoning steps (including any inductive reasoning utilized) may be provided to the user. In other words, the methods and/or systems described herein may provide improved explainability, accountability, trustworthiness, etc. compared to most AI systems. Additionally, the methods and system described herein are capable of learning incrementally from "known" cases and classifying the unknown cases. In contrast, most AI systems may undergo repeated training and deployment even though the utilized model no longer works). Further, the methods and systems described herein may be configured dynamically to predict new classes without affecting previously constructed graphs (or knowledge graphs). In contrast, most AI systems require retraining.

Figure 12:
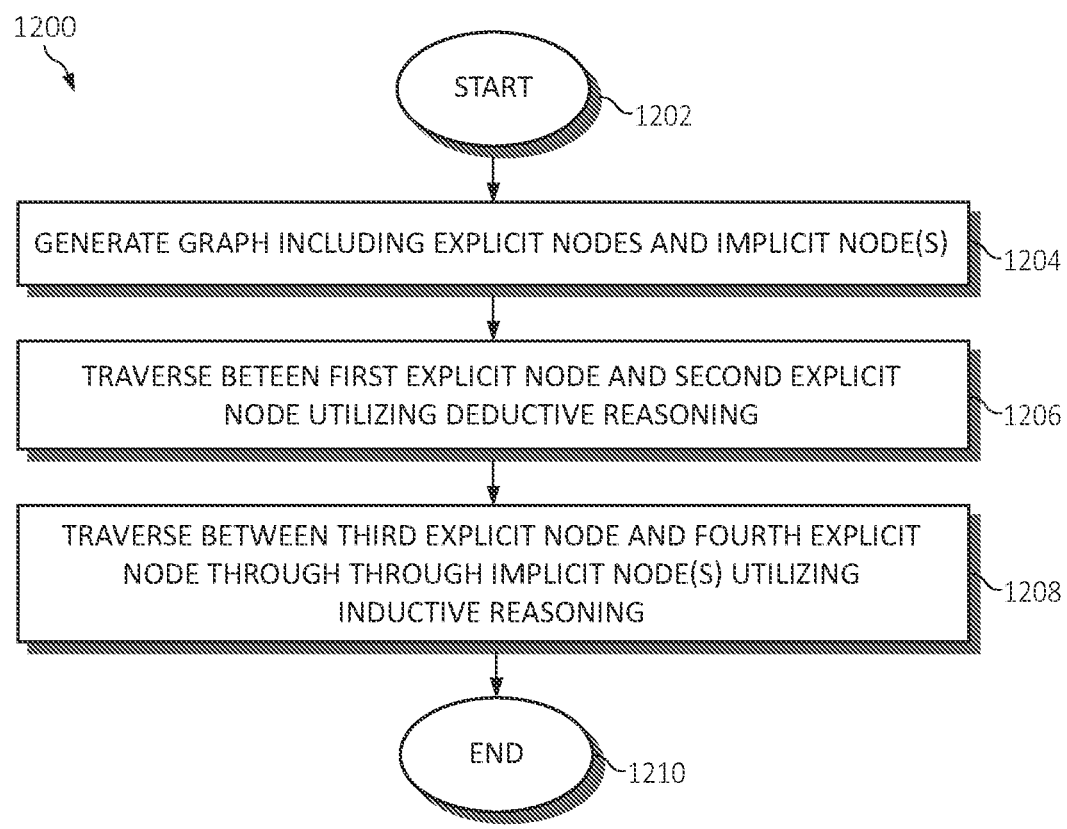
FIG. 12 is a flowchart diagram of an exemplary method for graph computing according to an embodiment of the present invention.

Turning to FIG. 12, a flowchart diagram of an exemplary method 1200 for graph computing (or reasoning) is provided. The method 1200 begins (step 1202) with, for example, information or input regarding one or more explicit nodes and one or more implicit nodes (as described above) being received from a user.

A graph (or graph database) including a plurality explicit nodes and at least one implicit node is generated (step 1204). The at least one implicit node may include a plurality of implicit nodes. The generating of the graph may be based on the received user input.

A first of the plurality of explicit nodes and a second of the plurality of explicit nodes are traversed between utilizing deductive reasoning (step 1206).

A third of the plurality of explicit nodes and a fourth of the plurality of explicit nodes are traversed between through the at least one implicit node utilizing inductive reasoning (step 1208). This traversal may include a first traversal from the third of the plurality of explicit nodes to the fourth of the plurality of explicit nodes through a first of the plurality of implicit nodes utilizing inductive reasoning and a second traversal from the third of the plurality of explicit nodes to the fourth of the plurality of explicit nodes through a second of the plurality of implicit nodes utilizing inductive reasoning. The first traversal may be external to the second of the plurality of implicit nodes, and the second traversal may be external to the first of the plurality of implicit nodes. In some embodiment, the traversing between the third of the plurality of explicit nodes and the fourth of the plurality of explicit nodes may include traversing from the third of the plurality of explicit nodes through a first of the plurality of implicit nodes to a second of the plurality of implicit nodes utilizing inductive reasoning and traversing from the second of the plurality of implicit nodes to the fourth of the plurality of explicit nodes utilizing inductive reasoning. The traversing between the third of the plurality of explicit nodes and the fourth of the plurality of explicit nodes through the at least one implicit node may be performed utilizing probabilistic inductive reasoning.

In some embodiments, a query associated with the graph may be received. A response to the query (and/or a signal representative thereof) may be generated based on the traversing between the first of the plurality of explicit nodes and the second of the plurality of explicit nodes and the traversing between the third of the plurality of explicit nodes and the fourth of the plurality of explicit nodes.

Method 1200 ends (step 1210) with, for example, the graph being traversed as much as possible utilizing deductive and inductive reasoning, as described above. In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for graph computing, by a processor, comprising:
generating a graph including a plurality of explicit nodes and at least one implicit node;
traversing between a first of the plurality of explicit nodes and a second of the plurality of explicit nodes utilizing deductive reasoning;
responsive to determining no additional traversals may be performed in the graph utilizing only the deductive reasoning, computing a probability threshold that a relevant inference may be generated via allowance of a traversal between a third of the plurality of explicit nodes and a fourth of the plurality of explicit nodes through the at least one implicit node utilizing inductive reasoning, wherein the probability threshold is based on multiple independent sources of information validating the generation of the relevant inference, and responsive to determining that the probability threshold has been surpassed, traversing between the third of the plurality of explicit nodes and the fourth of the plurality of explicit nodes through the at least one implicit node utilizing the inductive reasoning.

2. The method of claim 1, further comprising:
receiving a query associated with the graph; and
generating a response to the query based on the traversing between the first of the plurality of explicit nodes and the second of the plurality of explicit nodes and the traversing between the third of the plurality of explicit nodes and the fourth of the plurality of explicit nodes.

3. The method of claim 1, wherein the at least one implicit node includes a plurality of implicit nodes.

4. The method of claim 3, wherein the traversing between the third of the plurality of explicit nodes and the fourth of the plurality of explicit nodes includes a first traversal from the third of the plurality of explicit nodes to the fourth of the plurality of explicit nodes through a first of the plurality of implicit nodes utilizing inductive reasoning and a second traversal from the third of the plurality of explicit nodes to the fourth of the plurality of explicit nodes through a second of the plurality of implicit nodes utilizing inductive reasoning, wherein the first traversal is external to the second of the plurality of implicit nodes and the second traversal is external to the first of the plurality of implicit nodes.

5. The method of claim 3, wherein the traversing between the third of the plurality of explicit nodes and the fourth of the plurality of explicit nodes includes traversing from the third of the plurality of explicit nodes through a first of the plurality of implicit nodes to a second of the plurality of implicit nodes utilizing inductive reasoning and traversing from the second of the plurality of implicit nodes to the fourth of the plurality of explicit nodes utilizing inductive reasoning.

6. The method of claim 1, wherein the generating of the graph includes receiving user input associated with the at least one implicit node and generating the at least one implicit node based on the user input.

7. The method of claim 1, wherein the traversing between the third of the plurality of explicit nodes and the fourth of the plurality of explicit nodes through the at least one implicit node is performed utilizing probabilistic inductive reasoning.

8. A system for graph computing comprising:
a processor executing instructions stored in a memory device, wherein the processor:
generates a graph including a plurality of explicit nodes and at least one implicit node;
traverses between a first of the plurality of explicit nodes and a second of the plurality of explicit nodes utilizing deductive reasoning;
responsive to determining no additional traversals may be performed in the graph utilizing only the deductive reasoning, computes a probability threshold that a relevant inference may be generated via allowance of a traversal between a third of the plurality of explicit nodes and a fourth of the plurality of explicit nodes through the at least one implicit node utilizing inductive reasoning, wherein the probability threshold is based on multiple independent sources of information validating the generation of the relevant inference, and
responsive to determining that the probability threshold has been surpassed, traverses between the third of the plurality of explicit nodes and the fourth of the plurality of explicit nodes through the at least one implicit node utilizing the inductive reasoning.

9. The system of claim 8, wherein the processor further:
receives a query associated with the graph; and
generates a response to the query based on the traversing between the first of the plurality of explicit nodes and the second of the plurality of explicit nodes and the traversing between the third of the plurality of explicit nodes and the fourth of the plurality of explicit nodes.

10. The system of claim 8, wherein the at least one implicit node includes a plurality of implicit nodes.

11. The system of claim 10, wherein the traversing between the third of the plurality of explicit nodes and the fourth of the plurality of explicit nodes includes a first traversal from the third of the plurality of explicit nodes to the fourth of the plurality of explicit nodes through a first of the plurality of implicit nodes utilizing inductive reasoning and a second traversal from the third of the plurality of explicit nodes to the fourth of the plurality of explicit nodes through a second of the plurality of implicit nodes utilizing inductive reasoning, wherein the first traversal is external to the second of the plurality of implicit nodes and the second traversal is external to the first of the plurality of implicit nodes.

12. The system of claim 10, wherein the traversing between the third of the plurality of explicit nodes and the fourth of the plurality of explicit nodes includes traversing from the third of the plurality of explicit nodes through a first of the plurality of implicit nodes to a second of the plurality of implicit nodes utilizing inductive reasoning and traversing from the second of the plurality of implicit nodes to the fourth of the plurality of explicit nodes utilizing inductive reasoning.

13. The system of claim 8, wherein the generating of the graph includes receiving user input associated with the at least one implicit node and generating the at least one implicit node based on the user input.

14. The system of claim 8, wherein the traversing between the third of the plurality of explicit nodes and the fourth of the plurality of explicit nodes through the at least one implicit node is performed utilizing probabilistic inductive reasoning.

15. A computer program product for graph computing, by a processor, the computer program product embodied on a non-transitory computer-readable storage medium having computer-readable program code portions stored therein, the computer-readable program code portions comprising:
an executable portion that generates a graph including a plurality of explicit nodes and at least one implicit node;
an executable portion that traverses between a first of the plurality of explicit nodes and a second of the plurality of explicit nodes utilizing deductive reasoning;
an executable portion that, responsive to determining no additional traversals may be performed in the graph utilizing only the deductive reasoning, computes a probability threshold that a relevant inference may be generated via allowance of a traversal between a third of the plurality of explicit nodes and a fourth of the plurality of explicit nodes through the at least one implicit node utilizing inductive reasoning, wherein the probability threshold is based on multiple independent sources of information validating the generation of the relevant inference, and
an executable portion that, responsive to determining that the probability threshold has been surpassed, traverses between the third of the plurality of explicit nodes and the fourth of the plurality of explicit nodes through the at least one implicit node utilizing the inductive reasoning.

16. The computer program product of claim 15, wherein the computer-readable program code portions further include: an executable portion that receives a query associated with the graph; and an executable portion that generates a response to the query based on the traversing between the first of the plurality of explicit nodes and the second of the plurality of explicit nodes and the traversing between the third of the plurality of explicit nodes and the fourth of the plurality of explicit nodes.

17. The computer program product of claim 15, wherein the at least one implicit node includes a plurality of implicit nodes.

18. The computer program product of claim 17, wherein the traversing between the third of the plurality of explicit nodes and the fourth of the plurality of explicit nodes includes a first traversal from the third of the plurality of explicit nodes to the fourth of the plurality of explicit nodes through a first of the plurality of implicit nodes utilizing inductive reasoning and a second traversal from the third of the plurality of explicit nodes to the fourth of the plurality of explicit nodes through a second of the plurality of implicit nodes utilizing inductive reasoning, wherein the first traversal is external to the second of the plurality of implicit nodes and the second traversal is external to the first of the plurality of implicit nodes.

19. The computer program product of claim 17, wherein the traversing between the third of the plurality of explicit nodes and the fourth of the plurality of explicit nodes includes traversing from the third of the plurality of explicit nodes through a first of the plurality of implicit nodes to a second of the plurality of implicit nodes utilizing inductive reasoning and traversing from the second of the plurality of implicit nodes to the fourth of the plurality of explicit nodes utilizing inductive reasoning.

20. The computer program product of claim 15, wherein the generating of the graph includes receiving user input associated with the at least one implicit node and generating the at least one implicit node based on the user input.

21. The computer program product of claim 15, wherein the traversing between the third of the plurality of explicit nodes and the fourth of the plurality of explicit nodes through the at least one implicit node is performed utilizing probabilistic inductive reasoning.

\* \* \* \* \*